(12) United States Patent
Townsend et al.

(10) Patent No.: US 11,353,591 B2
(45) Date of Patent: Jun. 7, 2022

(54) METHOD AND DEVICE FOR LASER SAFETY VERIFICATION

(71) Applicants: STMicroelectronics (Grenoble 2) SAS, Grenoble (FR); STMICROELECTRONICS (RESEARCH & DEVELOPMENT) LIMITED, Marlow (GB)

(72) Inventors: Christopher Townsend, Edinburgh (GB); Pascal Mellot, Grenoble (FR)

(73) Assignees: STMICROELECTRONICS (GRENOBLE 2) SAS, Grenoble (FR); STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 112 days.

(21) Appl. No.: 17/024,418

(22) Filed: Sep. 17, 2020

(65) Prior Publication Data

US 2021/0096258 A1   Apr. 1, 2021

(30) Foreign Application Priority Data

Sep. 30, 2019 (EP) .................... 19306238

(51) Int. Cl.
*G01S 17/89* (2020.01)
*G01S 7/481* (2006.01)
*G01S 17/10* (2020.01)

(52) U.S. Cl.
CPC ............ *G01S 17/89* (2013.01); *G01S 7/4816* (2013.01); *G01S 17/10* (2013.01)

(58) Field of Classification Search
None
See application file for complete search history.

(56) References Cited

U.S. PATENT DOCUMENTS

| 11,209,310 | B2 * | 12/2021 | Mellot | G06T 7/50 |
| 2015/0285625 | A1 * | 10/2015 | Deane | G01S 17/42 |
| | | | | 348/140 |
| 2016/0227195 | A1 * | 8/2016 | Venkataraman | H04N 9/04559 |
| 2017/0278289 | A1 * | 9/2017 | Marino | G06T 11/60 |
| 2018/0023947 | A1 * | 1/2018 | Meng | G01B 11/303 |
| | | | | 348/46 |
| 2018/0091784 | A1 * | 3/2018 | Dutton | H04N 9/317 |
| 2018/0095168 | A1 * | 4/2018 | Hofmann | G01S 17/894 |
| 2019/0362511 | A1 * | 11/2019 | Jouppi | G06T 5/50 |
| 2021/0096258 | A1 * | 4/2021 | Townsend | G01S 7/4815 |

FOREIGN PATENT DOCUMENTS

| CA | 2972183 C | * | 3/2018 | ............. G06K 9/342 |
| CA | 3037058 A1 | * | 4/2018 | .......... G01S 17/107 |
| CN | 105051792 B | * | 2/2019 | ............. G06T 15/04 |

(Continued)

*Primary Examiner* — Reza Aghevli
(74) *Attorney, Agent, or Firm* — Slater Matsil, LLP

(57) ABSTRACT

The present disclosure relates to a method of laser safety verification for a depth map sensor, comprising illuminating, during a first illumination phase, using a laser illumination system, a first cluster of one or more first pixels of a pixel array of the depth map sensor, while not illuminating a second cluster, different from the first cluster, of one or more second pixels of the pixel array of the depth map sensor; and detecting, during the first illumination phase, a level of illumination of the second cluster.

23 Claims, 4 Drawing Sheets

(56) References Cited

FOREIGN PATENT DOCUMENTS

| CN | 109791652 A | * | 5/2019 | ......... G06K 7/10722 |
|---|---|---|---|---|
| CN | 106662433 B | * | 9/2019 | ......... G01B 11/2513 |
| WO | WO-2010063252 A1 | * | 6/2010 | ........... G06T 7/0075 |
| WO | WO-2010102840 A1 | * | 9/2010 | ........... G06T 7/0075 |
| WO | WO-2010130245 A1 | * | 11/2010 | ......... G06K 9/00355 |
| WO | 2018156412 A1 | | 8/2018 | |

* cited by examiner

METHOD AND DEVICE FOR LASER SAFETY VERIFICATION

CROSS-REFERENCE TO RELATED APPLICATIONS

This application claims the priority benefit of European Patent Application No. 19306238.7, filed on Sep. 30, 2019, the content of which is hereby incorporated by reference in its entirety to the maximum extent allowable by law

TECHNICAL FIELD

The present disclosure relates generally to the field of time of flight (ToF) depth map sensors, and in particular to a method and device for laser safety verification for such sensors.

BACKGROUND

The ability of time-of-flight (ToF) cameras based on single-photon avalanche diodes (SPADs) to provide precise photon arrival times makes them popular candidates for depth map sensors. Such ToF cameras generally comprise a laser source such as a vertical-cavity surface-emitting laser (VCSEL) that emits, into an image scene, optical pulses or an optical waveform, and an array of SPADs for detecting the return signal.

In a typical ToF camera, the laser source is usually able to reach output power levels which are sufficiently high to damage the eye. Laser safety of such ToF cameras is thus of critical importance. While current technology allows laser safety in ToF cameras to be achieved under many operating conditions, there is a need for a system and method providing further improved safety verification.

SUMMARY

There is a need to improve laser safety verification methods and devices for depth map sensors.

One embodiment addresses all or some of the drawbacks of known laser safety verification methods and devices for depth map sensors.

One embodiment provides a method of laser safety verification for a depth map sensor, comprising illuminating, during a first illumination phase, using a laser illumination system, a first cluster of one or more first pixels of a pixel array of the depth map sensor, while not illuminating a second cluster, different from the first cluster, of one or more second pixels of the pixel array of the depth map sensor; and detecting, during the first illumination phase, a level of illumination of the second cluster.

According to one embodiment, the method comprises comparing the detected level of illumination of the second cluster, during the first illumination phase, with a first threshold value to verify the safety of the laser illumination system.

According to one embodiment, the method comprises detecting, during the first illumination phase, a level of illumination of the first cluster, the first threshold value being a variable threshold, the level of which is generated based on the level of illumination of the first cluster.

According to one embodiment, the method comprises illuminating, during a second illumination phase, using the laser illumination system, the second cluster, while not illuminating the first cluster; and detecting, during the second illumination phase, a level of illumination of the first cluster.

According to one embodiment, the method comprises comparing the level of illumination of the first cluster, during the second illumination phase, with a second threshold value to verify the safety of the laser illumination system.

According to one embodiment, the first and second threshold values are the same.

According to one embodiment, the depth map sensor comprises N clusters, including said first and second clusters, where N is equal to two or more, the method further comprising detecting, during the first illumination phase, a level of illumination of all N clusters except the first cluster.

According to one embodiment, the laser illumination system comprises N laser light sources.

According to one embodiment, the method comprises N illumination phases, including the first and second illumination phases, each illumination phase using one of the N laser light sources.

According to one embodiment, the illumination level of the second cluster is obtained by reading the second pixels.

According to one embodiment, the illumination level of the second cluster is obtained by averaging outputs of the second pixels.

One embodiment provides a non-transitory storage medium, storing computer instructions that cause such a method to be implemented when executed by a processing device.

One embodiment provides a device comprising a laser illumination system; a first cluster of one or more first pixels of a pixel array of a depth map sensor, a second cluster, different from the first cluster, of one or more second pixels of the pixel array of the depth map sensor, and a control circuit. The control circuit is configured to illuminate, during a first illumination phase, using the laser illumination system, the first cluster while not illuminating the second cluster; and detect, during the first illumination phase, a level of illumination of the second cluster.

According to one embodiment, the laser illumination system comprises a least one vertical-cavity surface-emitting laser.

According to one embodiment, each pixel comprises at least one single-photon avalanche diode.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, or to a depth map sensor as orientated during normal use.

Unless specified otherwise, the expressions "around", "approximately", "substantially" and "in the order of" signify within 10%, and preferably within 5%.

Figure 1:
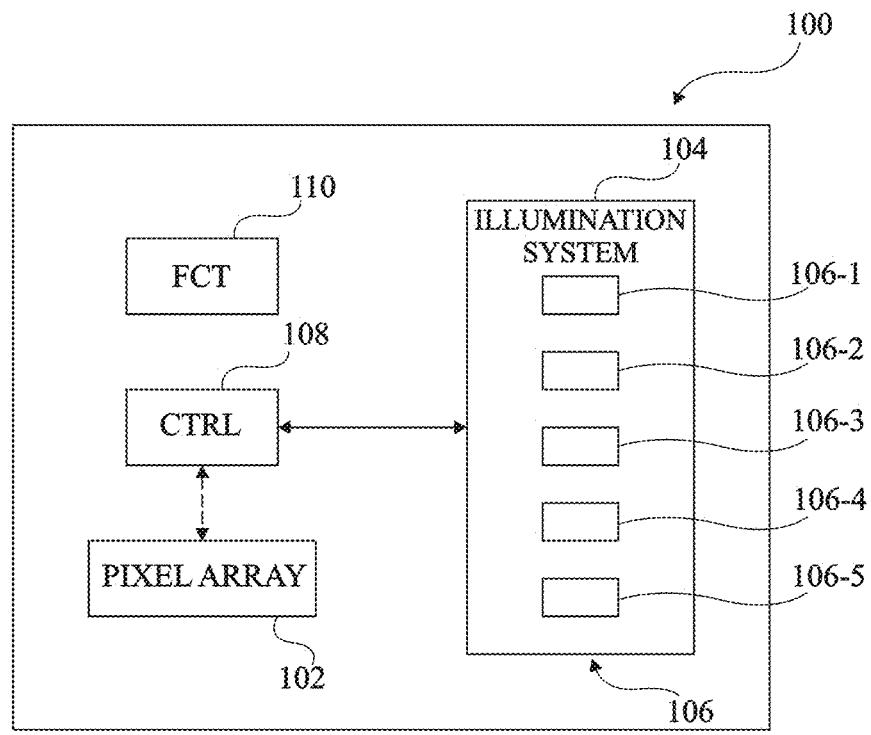
FIG. 1 schematically illustrates, in the form of blocks, a depth map sensor according to an example embodiment of the present disclosure.

FIG. 1 schematically illustrates, in the form of blocks, a depth map sensor 100 according to an example embodiment of the present disclosure.

According to this embodiment, the depth map sensor 100 comprises a pixel array 102. The pixel array 102 is for example a scanned return array that is adapted to be scanned in synchronization with an illumination of an image scene. In some embodiments, the pixel array 102 is a single-photon avalanche diode (SPAD) array, which is an array 102 whose pixels each comprise at least one SPAD.

The image scene is illuminated by a laser illumination system 104. According to this embodiment, the laser illumination system 104 comprises a plurality of laser light sources 106. The laser illumination system 104 is for example a scanned array of vertical-cavity surface-emitting lasers (VCSELs), where each light source 106 corresponds to at least one VCSEL. The depth map sensor 100 may include at least one lens and/or diffuser (not shown in FIG. 1), which partially or entirely covers the laser illumination system 104.

In the following disclosure, the letter "N" denotes the total number of laser light sources 106 belonging to the laser illumination system 104 of the depth map sensor 100. In FIG. 1, five laser light sources 106 (106-1, 106-2, 106-3, 106-4 and 106-5) arranged in a one by five array are represented, although no limitation is implied as to the number and the arrangement of laser light sources 106 in the laser illumination system 104. For example, more generally, the array could be an i by j array of light sources 106, where i and j are each integers equal to 1 or more and i times j equals N.

More generally, the laser illumination system 104 successively illuminates various regions of the image scene, the regions potentially being partially overlapping. In some alternative embodiments (not shown in FIG. 1), the laser illumination system 104 comprises only one laser light source, e.g. a single VCSEL, and an optical system adapted to scan the image scene. Such an optical system may comprise at least one mirror which is tilted at discrete angles with respect to the laser light source, thus deflecting the emitted laser light towards a plurality of N regions within the image scene, which again may be partially overlapping.

The light sources 106 of the laser illumination system 104 are driven by a control circuit 108. The pixel array 102 may also be driven by the control circuit 108, as represented in FIG. 1. The pixel array 102 is alternatively driven by another element or circuit (not shown in FIG. 1) of the depth map sensor 100. In some embodiments, the control circuit 108 is a microcontroller, an application-specific integrated circuit (ASIC) or a field-programmable gate array (FPGA).

The depth map sensor 100 can further comprise several other elements or circuits which are symbolized, in FIG. 1, by a single functional block 110.

Each laser source 106 of the laser illumination system 104 emits or transmits, into the image scene, optical pulses or an optical waveform. A return signal, caused by the reflection of these optical pulses or this optical waveform in the image scene, is detected by the pixel array 102. According to one embodiment, the depth map sensor 100 can be configured to perform either direct ToF (dToF) or indirect ToF (iToF).

In the case of dToF, the time delay of each return pulse with respect to the corresponding transmitted pulse is estimated in order to determine the time-of-flight, which can be converted into a distance measurement.

In the case of iToF, the phase of the returned waveform is compared with that of the emitted waveform in order to estimate the time-of-flight, which is then converted into a distance measurement.

Figure 2:
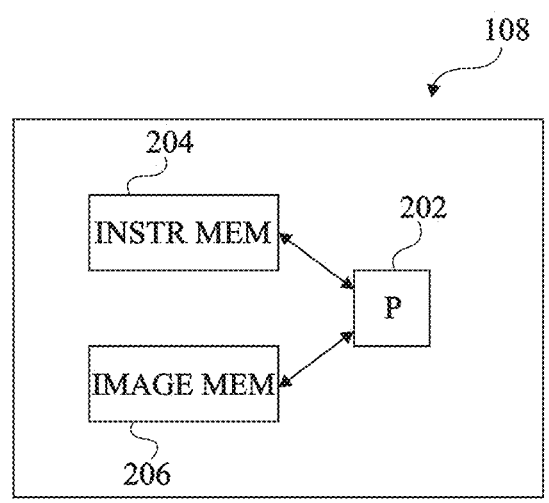
FIG. 2 schematically illustrates, in the form of blocks, a control circuit of the depth map sensor of FIG. 1 according to an example embodiment.

FIG. 2 schematically illustrates, in the form of blocks, the control circuit 108 of the depth map sensor 100 of FIG. 1 according to an example embodiment in a case in which the functions of this control circuit 108 are implemented in software.

According to this embodiment, the control circuit 108 comprises a processing device (P) 202, an instruction memory 204 and an image memory 206. The instruction memory 204 is for example a non-transitory storage medium adapted to store computer instructions, which may be executed by the processing device 202.

The image memory 206 is also for example a non-transitory storage medium. In some embodiments, the image memory 206 is adapted to store information provided by the pixel array 102 of FIG. 1. More specifically, the image memory 206 may store data related to a three-dimensional (3D) view of the image scene, also termed "depth map", as captured by the depth map sensor 100.

Figure 3:
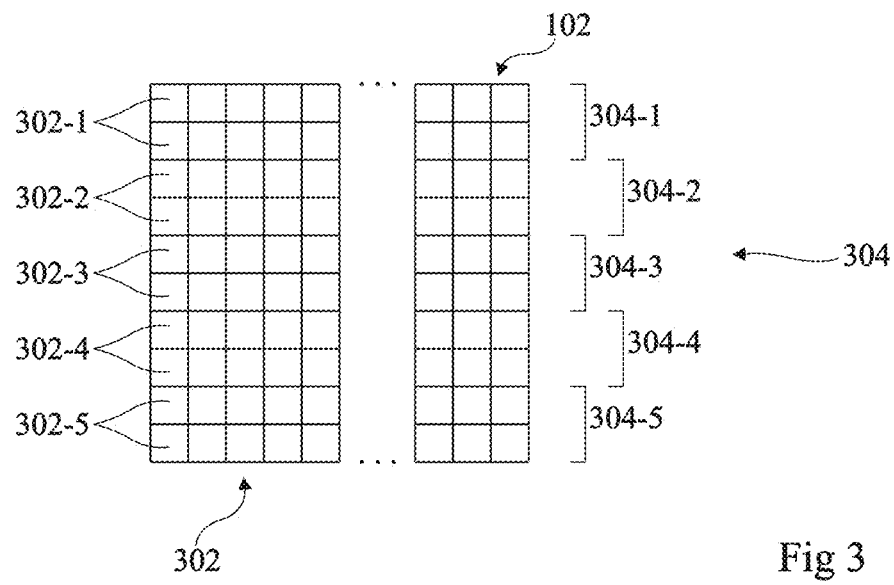
FIG. 3 schematically illustrates a pixel array of the depth map sensor of FIG. 1 according to an example embodiment.

FIG. 3 schematically illustrates the pixel array 102 of the depth map sensor 100 of FIG. 1 according to an example embodiment.

The pixel array 102 is formed of an array of pixels 302. According to this embodiment, the pixel array 102 is divided into several clusters 304 of pixels 302. Clusters 304 are defined here as regions of the pixel array 102, each comprising at least one pixel 302 and preferably a plurality of adjacent pixels 302.

In the example depicted in FIG. 3, the pixel array 102 is divided into five clusters 304, each cluster 304 comprising two adjacent rows of pixels 302. More specifically:

a cluster 304-1 comprises two rows of pixels 302-1;
a cluster 304-2 comprises two rows of pixels 302-2;
a cluster 304-3 comprises two rows of pixels 302-3;
a cluster 304-4 comprises two rows of pixels 302-4; and
a cluster 304-5 comprises two rows of pixels 302-5.

The clusters 304 are shown in FIG. 3 as rectangular-shaped regions of the pixel array 102, each cluster 304 comprising a same number of pixels 302, though no limitation is implied as to the shapes of the clusters 304 and number of pixels 302 in each cluster 304. In particular, each of the clusters 304 may have any shape and may comprise any number of pixels 302, which may or may not be adjacent. Although five clusters 304 (304-1, 304-2, 304-3, 304-4 and 304-5) are represented in FIG. 3, the pixel array 102 may comprise any number of clusters 304.

During operation of the depth map sensor 100 of FIG. 1, the pixels 302 of one of the clusters 304 are for example illuminated at once during an illumination phase. Each of the clusters 304 is for example illuminated sequentially in a corresponding illumination phase. The clusters 304 of the pixel array 102 are for example activated to detect illumination from the image scene in sequence from top to bottom as they are illuminated during the scanning operation.

According to one embodiment, the sequential activation of the clusters 304 (304-1, 304-2, 304-3, 304-4 and 304-5) is performed in synchronization with the illumination of corresponding or associated laser light sources 106 (106-1, 106-2, 106-3, 106-4 and 106-5) of the laser illumination system 104 of FIG. 1. According to this embodiment, the number of clusters 304 is equal to the number N of laser light sources 106, where N is equal to two or more. In other words, each laser light source 106 of the laser illumination system 104 is configured to illuminate a corresponding cluster 304 of the pixel array 102.

In the following disclosure, the time period during which a given laser source 106 illuminates a cluster 304 is termed "illumination phase". Given that the laser illumination system 104 is assumed to comprise N laser light sources 106, there are also N illumination phases. In particular:
one illumination phase is defined by the cluster 304-1 being illuminated using the laser light source 106-1; and
another illumination phase is defined by the cluster 304-2 being illuminated using the laser light source 106-2.

The depth map sensor 100 of FIG. 1 is already adapted to reach a high degree of operation safety, e.g. by limiting the light output energy and/or power of its laser illumination system 104. However, in some very rare failure scenarios, corresponding to marginal or corner cases, laser safety may not be fully guaranteed despite all current precautions.

Such failure scenarios could possibly occur, for example, if a water droplet were to accidentally form in a transmission path of the laser light emitted by the illumination system 104 of FIG. 1. Supposing that the depth map sensor 100 is embedded in a mobile phone, a raindrop could for example happen to fall just above the depth map sensor 100 on a cover glass of the phone. By acting as a convergent optical lens, such a raindrop could tend to focus the emitted laser light. Delivered power and/or energy may then be concentrated on a smaller spot than without any water droplet being located on top of the illumination system 104, thus increasing local light intensity in an area of the image scene. This could be hazardous for a user of the mobile phone comprising the depth map sensor 100, for example if, at the same time, the laser light output happens to be orientated towards the user's eyes.

Other failure scenarios include external optics being added to a device featuring the depth map sensor 100, lens drop or damage, water ingress inside the sensor 100, etc. Laser safety issues may also arise in a rare case where the scanning of the laser light sources 106 gets stuck, the laser light being then continuously emitted towards a same region of the image scene. This may result in a high concentration of power in this region, potentially exceeding a power allowance, instead of the power being spread between several regions of the image scene when it is scanned normally.

While laser safety in most frequent cases is generally fully ensured by known methods, failure scenarios such as those described above can be difficult to detect with a satisfactory level of certainty. In fact, existing methods of laser safety verification infer potentially unsafe states by an indirect detection of specific failure modes. Unfortunately, the existing methods are often limited to these specific failure modes. Laser safety detection in several other use cases may therefore either lead to false positive, that is cases where laser safety issues are wrongly detected, or to safety detection fails, that is cases where true laser safety issues remain undetected.

It is known to use a reference detector adapted to capture a portion of the emitted light that is reflected by an output lens, typically located above the laser source. Such a reference detector, which is generally optically isolated from the pixel array, may be used to infer the output power and/or energy that is emitted through the lens. However, such an indirect technique is very challenging to calibrate, as it is difficult to set a threshold that reliably separates unsafe laser operation from corner cases during normal use. Furthermore, should the optical characteristics of the laser light be changed by an optically-active element located beyond the lens, the reference detector may be unable to detect it.

Figure 4:
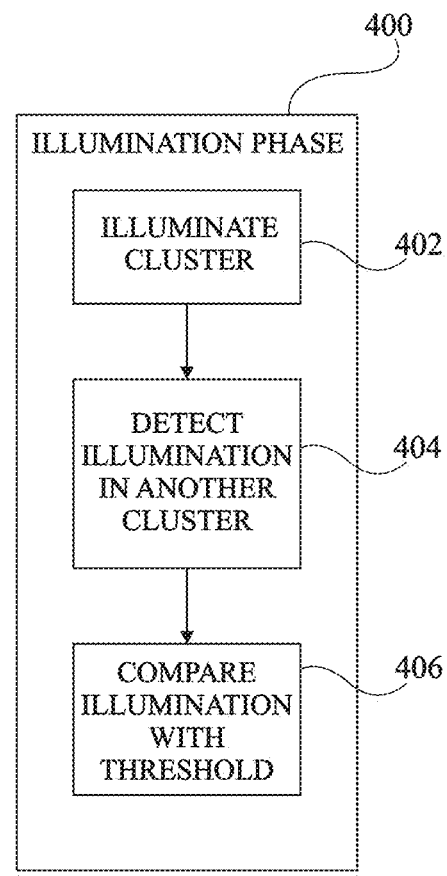
FIG. 4 is a flow diagram illustrating operations in a method of laser safety verification of the depth map sensor of FIG. 1 according to an example embodiment.

FIG. 4 is a simplified flow diagram of an embodiment of operations associated with the laser safety verification of the depth map sensor 100 of FIG. 1 during a single illumination phase 400.

The operations described below in relation with FIG. 4 may for example be executed by the control circuit 108 of FIGS. 1 and 2. During these operations, it is presumed that the depth map sensor 100 is pointed at an image scene reflecting, at least partially, the laser light emitted by the depth map sensor 100, and that the depth map sensor 100 is not, for example, oriented towards the sky.

For the sake of clarity, it is assumed here that the illumination phase 400 corresponds to the illumination phase during which the laser light source 106-1 of the depth map sensor 100 illuminates the cluster 304-1, as described in relation with FIG. 3. According to this embodiment, the illumination phase 400 begins with illuminating a cluster (block 402), i.e. the cluster 304-1 of the pixel array 102.

Because the cluster 304-1 is associated with the laser light source 106-1, an illumination is expected to be detected only by the cluster 304-1, whereas almost no illumination should be captured by other clusters 304. However, in at least some of the above-described failure scenarios, the inventors have found that a significant amount of light hits at least some of the other clusters, such as for example the cluster 304-2.

The level of illumination is hence detected in at least one other cluster (block 404), different from the cluster 304-1. For example, the level of illumination is detected in the cluster 304-2 while illuminating the cluster 304-1 with the laser light source 106-1.

According to an embodiment, the light that reaches the cluster 304-2, that is the illumination of the cluster 304-2, is captured and detected or measured by the cluster 304-2 during the illumination phase of the cluster 304-1. The level of illumination captured by the cluster 304-2 is afterwards compared with a threshold value (block 406).

The threshold value may be set during a calibration phase, for example a calibration phase performed in factory, using a reference/standard environment, after production of the depth map sensor 100. Such a threshold value may include a margin whose value is for example defined with respect to a noise level such as ambient light taking into account a future implementation of the depth map sensor 100 in a product. For example, the threshold value is set using a highly reflective surface, so as to calibrate the depth map sensor 100 by exposing it to the highest illumination level that may be reached during its future operation.

Figure 5:
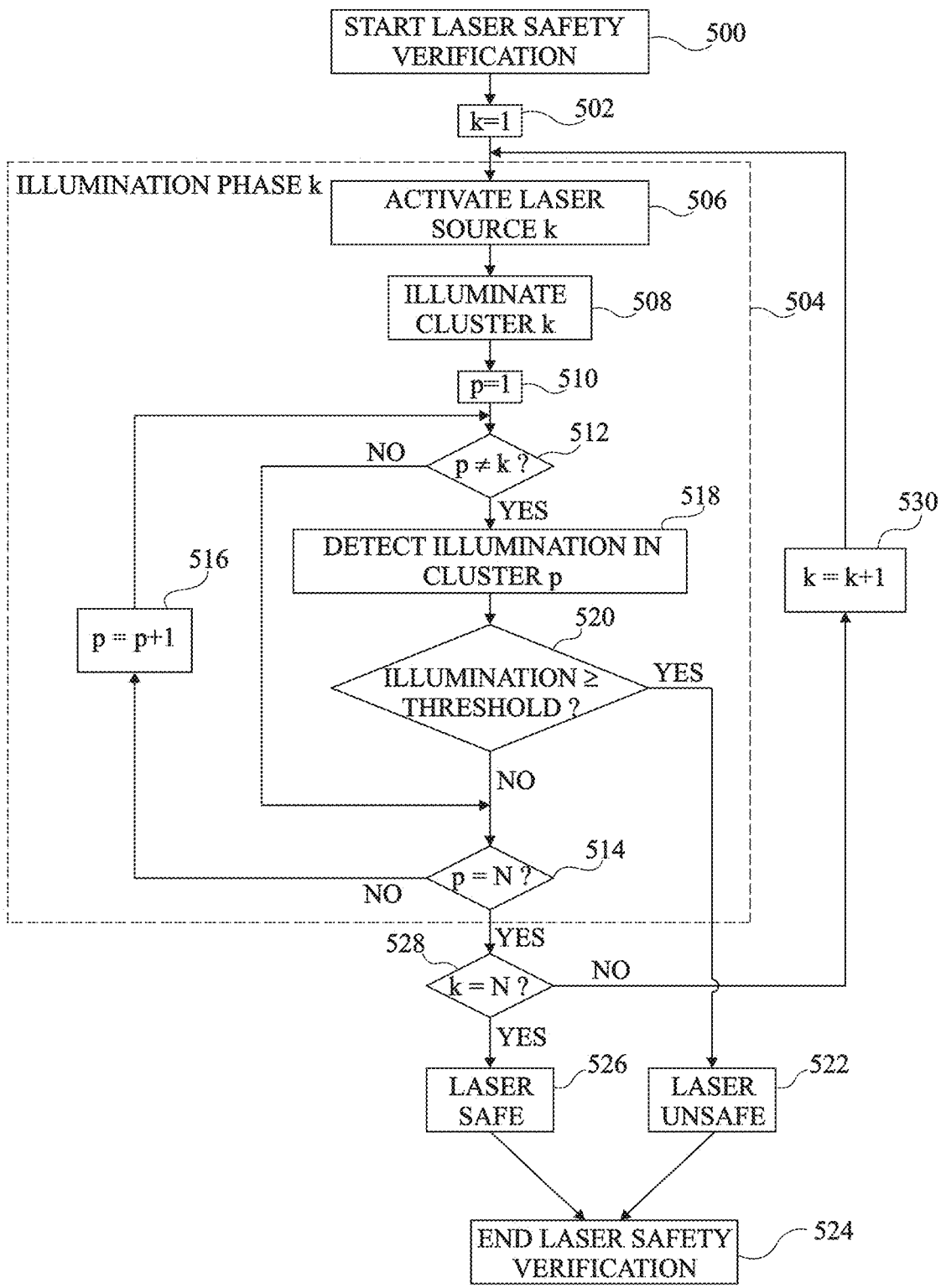
FIG. 5 is a flow diagram illustrating operations in a method of laser safety verification of the depth map sensor of FIG. 1 according to another example embodiment.

FIG. 5 is a flow diagram illustrating operations in a method of laser safety verification of the depth map sensor 100 of FIG. 1 according to another example embodiment.

The flow diagram of FIG. 5 more specifically depicts a method of laser safety verification comprising N illumination phases, each using one of the N laser light sources 106 of the illumination system 104. During each of the N illumination phases, all N clusters 304 of the pixel array 102, except the cluster 304 that is illuminated by the considered laser light source 106, are successively swept through so as to detect their level of illumination and to compare it with a threshold value.

For the sake of clarity, the threshold value is assumed to be the same for all N clusters 304 in the example embodiment of FIG. 5. However, at least one different threshold value may alternatively be set for at least one of the N clusters 304, for example to take into account process variations between the pixels of different clusters 304.

The level of illumination of each cluster 304 may be obtained by averaging the output of each of its pixels 302. The level of illumination of each cluster 304 may alternatively be defined as the peak value, which is the highest illumination level reached among all pixels 302 of the cluster 304. For example, as known by those skilled in the art, a SPAD array of a depth map sensor generally operates by generating, at each pixel, events in response to photons hitting the pixel. A counter within each pixel, or outside the pixel array, is used to count the events occurring at each pixel. The output of a pixel for example corresponds to the sum of one or more count values generated by the events detected at the considered pixel.

The threshold may be a relative threshold. In such a case, the threshold may correspond, for a cluster 304 that is not illuminated, to a detected level of illumination equal to a percentage, e.g. 10%, of the level of illumination of the cluster 304 that is illuminated. The laser safety verification method may thus comprise detecting the illumination of the cluster 304 that is illuminated.

The threshold may alternatively be an absolute threshold, i.e. a threshold value that is set regardless of the illumination of the cluster 304 that is illuminated.

The method described hereafter may be executed by the control circuit 108 of FIG. 1. For example, when the control circuit 108 comprises the processing device 202 and the instruction memory 204 of FIG. 2, the instruction memory 204 may store computer instructions that cause the method described below to be implemented when executed by the processing device 202.

According to an embodiment, the beginning of the laser safety verification method (block 500) is followed by the setting of a counter k to the value 1 (block 502). A k-th illumination phase (dashed block 504) then starts, comprising blocks 506 to 520, and a k-th laser light source is activated (block 506). This causes a k-th cluster to be illuminated (block 508).

In the flow diagram represented in FIG. 5, each value of k corresponds to one of the N illumination phases, using one of the N laser light sources, k being thus an integer ranging from 1 to N. If applied to the depth map sensor 100 as described in relation with FIG. 1, each value of k represents one of the five possible illumination phases using one of the five laser light sources 106 of the laser illumination system 104. In this case, k is ranging from 1 to 5.

With k being equal to 1 at this stage of the flow diagram, the illumination phase of the cluster 304-1 starts by activating the laser light source 106-1, which in turn causes the cluster 304-1 to be illuminated.

A counter p is then set to the value 1 (block 510). According to this embodiment, the counter p is used for sweeping through the N clusters 304. If applied to the pixel array 102 as described in relation with FIG. 3, each value of p represents one of the five clusters 304 of pixels 302. In this case, p is an integer ranging from 1 to 5.

The value of the counter p is then compared with the value of the counter k (block 512), in order to exclude an illumination detection by the cluster 304 associated with the activated laser light source 106, i.e. the case in which p=k. In the case that p=k (output NO of block 512), the cluster 304-1 is not activated to detect an illumination, and the method goes straight to block 514.

The value of the counter p is then compared with the value N (block 514). This allows for all the N clusters, except the cluster associated with the activated laser light source, to be swept through during each illumination phase. At this stage, the value of the counter p is equal to 1, which is not equal to N (output NO of block 514), as N is assumed to be equal to 5.

The counter p is incremented (block 516) and the comparison 512 between p and k happens again. At this point, the value of the counter p is equal to 2 while the value of the counter k is still equal to 1. Counters p and k hence have different values (output YES of block 512).

A level of illumination is then detected by a p-th cluster (block 518), that is the cluster 304-2, at this stage.

The illumination of the cluster 304-2 is then compared to the threshold value (block 520). To this end, an average level or a peak level, based on the outputs of the pixels 302-2 belonging to the cluster 304-2, may for example be compared to the threshold value by the control circuit 108 of FIG. 1.

According to one embodiment, if the illumination of the cluster 304-2 is found to be greater than or equal to the threshold value (output YES of block 520), the depth map sensor 100 is considered to be laser unsafe (block 522) and the laser safety verification method ends (block 524). This may for example occur during one of the failure scenarios that have been previously described.

According to this embodiment, if the illumination of the cluster 304-2 is found to be lower than the threshold value (output NO of block 520), the depth map sensor 100 is temporarily considered to be laser safe. The laser safety verification method therefore carries on by comparing the illumination of the other clusters, namely the clusters 304-3, 304-4 and 304-5, with the threshold value. This is achieved by incrementing the value of p and therefore repeating the operations described above in relation with blocks 512, 518, 520, 514 and 516.

Supposing that the illumination detected by the clusters 304-3, 304-4 and 304-5 is lower than the threshold value, the depth map sensor 100 is so far still considered to be laser safe. At this point, the value of the counter p is equal to 5, that is to say equal to N (output YES of block 514). The illumination phase of the cluster 304-1 is therefore completed.

The value of the counter k is then compared with the value N (block 528). This allows for all the N illumination phases, that is to say all the N laser light sources 106, to be swept through during the laser safety verification method. At this stage, the value of the counter k is equal to 1, which is not equal to N (output NO of block 528).

The counter k is incremented (block 530). The value of the counter k being, at this stage, equal to 2, the illumination phase of the cluster 304-2 begins and the laser light source 106-2 is activated. The illumination phase of the cluster 304-2 is performed in a similar way to what has been previously described in relation with the illumination phase of the cluster 304-1.

If the illumination detected by all clusters 304, except the cluster 304-2, is smaller than the threshold value, the illumination phase of the cluster 304-2 ends and the depth map sensor 100 is still considered to be laser safe at that point. In this case, the laser safety verification method continues and the illumination phases follow one another until the end of the illumination phase of the cluster 304-5.

At this step, the value of the counter k is equal to 5, that is to say equal to N (output YES of block 528). Assuming that no illumination reaching or exceeding the threshold value has been detected while sweeping through the laser light sources 106 and the clusters 304, the depth map sensor 100 is considered to be laser safe (block 526). The depth map sensor 100 is otherwise considered to be laser unsafe. In both cases, the laser safety verification method then reaches its end 524.

The laser safety verification method described above in relation with FIG. 5 may be executed by the control circuit 108 before any ranging operation performed by the depth map sensor 100. According to an embodiment, the laser safety detection method is executed around every 30 ms.

In the depth map sensor 100, the clusters 304 of the pixel array 102 may be scanned from top to bottom during operation, one cluster being read while the next cluster is detecting a level of illumination. In this case, the laser safety verification method described above is advantageously compatible with performing such parallel reading and detection operations. However, in alternative embodiments, it would be possible to scan the clusters 304 of the pixel array 102 in other directions, e.g. from bottom to top, from right to left or from left to right. It would furthermore be possible to have illumination phases in which a cluster 304 is activated in order to detect a level of illumination while some or all of the other clusters are successively illuminated.

In alternative embodiments, during the illumination of one cluster, the detection of the illumination of several other clusters may be performed in parallel. In other words, detection of the illumination may occur, at once, in a plurality of clusters. This would advantageously enable to perform the laser safety verification in a shorter time.

More generally, the laser safety verification method that has been previously described in relation with FIG. 5 may be adapted to any number of light sources 106 and any number of clusters 304. The method may further be adapted to cases where only some of the light sources 106 are activated and/or only some of the clusters 304 detect an illumination. For example, one or more clusters of interest (CoI), that is one or more clusters whose illumination is considered to be particularly relevant to laser safety verification, may be defined. The order in which an illumination is detected by clusters 304 during illumination phases may vary from one illumination phase to another. The order in which laser light sources 106 are activated may also vary from one laser safety verification to another. All such variations are within the capabilities of those skilled in the art based on the functional description provided hereinabove.

Figure 6:
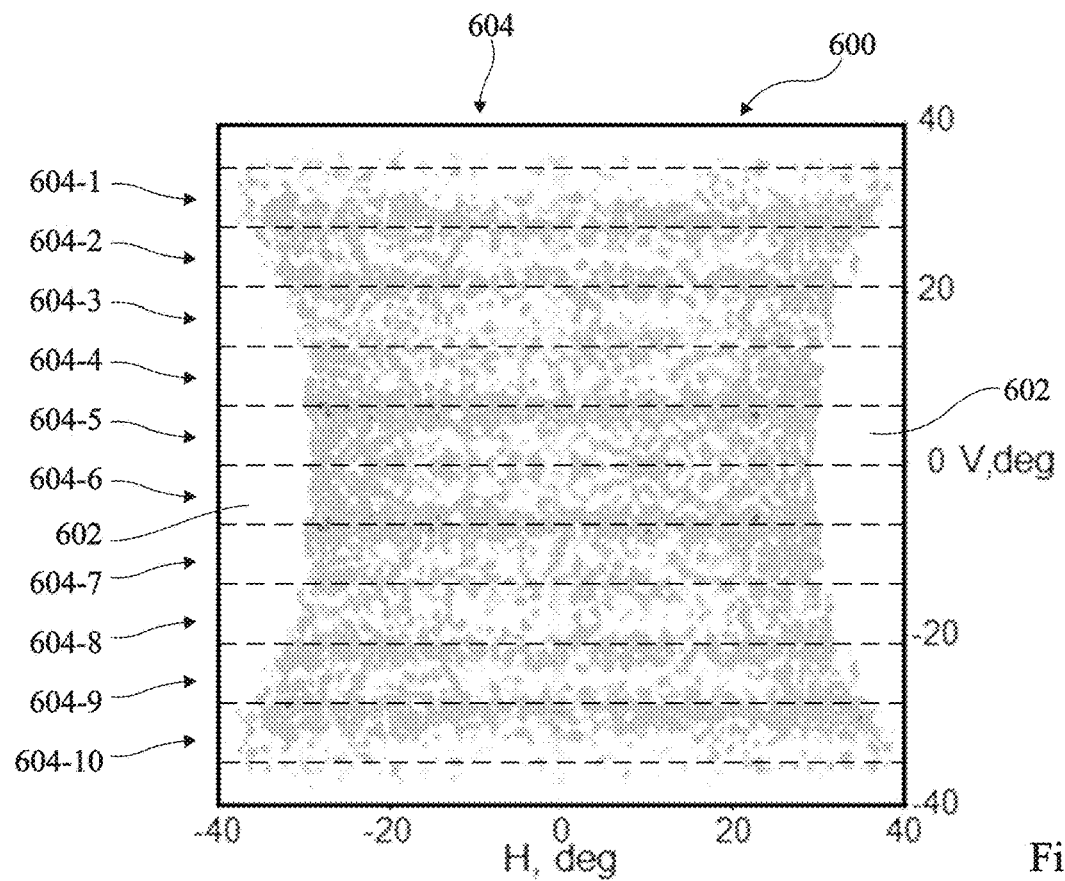
FIG. 6 shows an example of the illumination captured by the pixel array of FIG. 3.
Figure 7:
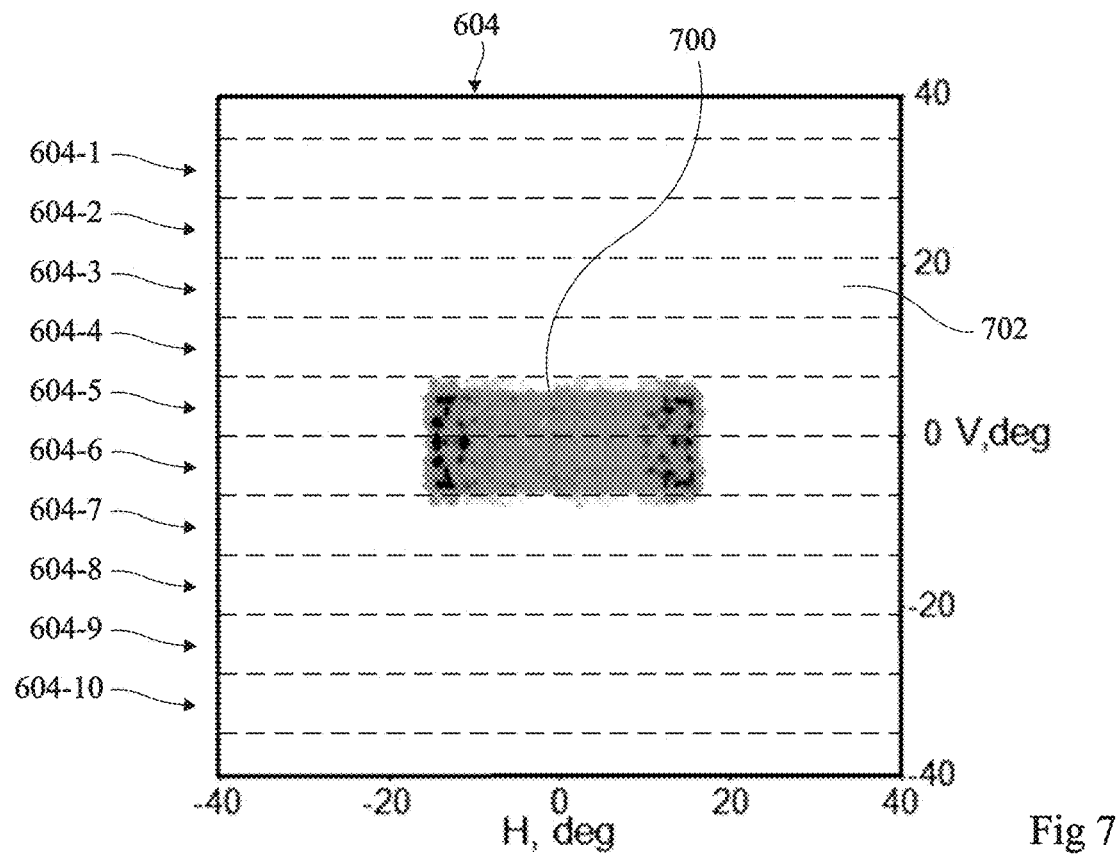
FIG. 7 shows another example of the illumination captured by the pixel array of FIG. 3.

FIGS. 6 and 7 show two examples of the illumination captured by the pixel array 102 of FIG. 3. More specifically, FIGS. 6 and 7 each are plots of the angular distribution of the illumination level or intensity detected by the pixel array 102. In the examples of FIGS. 6 and 7, it is assumed that, in the image scene, an angular range of 80°, from −40° to +40°, is both horizontally (H, deg) and vertically (V, deg) covered by the depth map sensor 100 of FIG. 1. In other words, these angular ranges are covered by the sequence of illumination phases of the depth map sensor 100.

In the example of FIGS. 6 and 7, it is assumed that ten clusters 604 (604-1, 604-2, 604-3, 604-4, 604-5, 604-6, 604-7, 604-8, 604-9 and 604-10) of the pixel array 102 are scanned vertically, from top to bottom.

In the plots of FIGS. 6 and 7, the illumination levels are shown in grayscale. White or light gray areas correspond, in this example, to low illumination levels while dark gray or black areas correspond to high illumination levels.

In FIG. 6, the plot of the illumination captured by the pixel array 102 mainly features a first large area 600 and two smaller second areas 602. The first area 600 and the second areas 602 being respectively colored in light gray and in white, it may be inferred that the illumination power is widely spread in the image scene. The plot of FIG. 6 corresponds, for example, to a laser safe operation where the power of the laser illumination system 104 is almost evenly distributed among various regions in the image scene.

In FIG. 7, the plot of the illumination captured by the pixel array 102 mainly features a rectangular spot 700 surrounded by a large white third area 702. The spot 700 is both smaller and darker than the first area 600 of FIG. 6, whereas the white third area 702 is wider than the second areas 602 of FIG. 6. It may hence be inferred that the illumination power is concentrated in the image scene. In this case, the power distribution is said to have "collapsed". The plot of FIG. 7 corresponds, for example, to a laser unsafe operation where the power of the laser illumination system 104 is focused on only one or some of the regions of the image scene.

An execution of the method that has previously been described in relation with FIG. 5 may lead to the detection of a laser safe situation in the case of FIG. 6 and of a laser unsafe situation in the case of FIG. 7. The image scene could also have been scanned horizontally, e.g. from left to right. This would also have led to similar detections.

Various embodiments and variants have been described. Those skilled in the art will understand that certain features of these embodiments can be combined and other variants will readily occur to those skilled in the art. In particular, the pixels 302 of the pixel array 102 may not comprise SPADs. The pixel array 102 may instead comprise other types of pixels, such as for example CMOS pixels. The number, shape and area of the clusters 304 of pixels 302 may furthermore be adapted to the application.

Finally, the practical implementation of the embodiments and variants described herein is within the capabilities of those skilled in the art based on the functional description provided hereinabove. In particular, the practical method used for reading the pixels and storing the corresponding information is within the capabilities of those skilled in the art.

What is claimed is:

1. A method of laser safety verification for a depth map sensor, the method comprising:
    illuminating, during a first illumination phase, using a laser illumination system, a first cluster of one or more first pixels of a pixel array of the depth map sensor, while not illuminating a second cluster, different from the first cluster, of one or more second pixels of the pixel array of the depth map sensor; and
    detecting, during the first illumination phase, a level of illumination of the second cluster.

2. The method of claim 1, further comprising comparing the detected level of illumination of the second cluster, during the first illumination phase, with a first threshold value to verify safety of the laser illumination system.

3. The method of claim 2, further comprising detecting, during the first illumination phase, a level of illumination of the first cluster, the first threshold value being a variable threshold having a level generated based on the detected level of illumination of the first cluster.

4. The method of claim 1, further comprising:
    illuminating, during a second illumination phase, using the laser illumination system, the second cluster, while not illuminating the first cluster; and
    detecting, during the second illumination phase, a level of illumination of the first cluster.

5. The method of claim 4, further comprising comparing the detected level of illumination of the first cluster, during the second illumination phase, with a second threshold value to verify safety of the laser illumination system.

6. The method of claim 5, further comprising comparing the detected level of illumination of the second cluster, during the first illumination phase, with the second threshold value to verify the safety of the laser illumination system.

7. The method of claim 1, wherein the depth map sensor comprises N clusters, including the first and second clusters, where N is equal to two or more, the method further comprising detecting, during the first illumination phase, a level of illumination of all N clusters except the first cluster.

8. The method of claim 7, wherein the laser illumination system comprises N laser light sources.

9. The method of claim 8, further comprising:
    illuminating, during a second illumination phase, using the laser illumination system, the second cluster, while not illuminating the first cluster; and
    detecting, during the second illumination phase, a level of illumination of the first cluster;
    there being N illumination phases, including the first and second illumination phases, each illumination phase using a respective one of the N laser light sources.

10. The method of claim 1, further comprising obtaining the level of illumination of the second cluster by reading the second pixels.

11. The method of claim 1, further comprising obtaining the level of illumination of the second cluster by averaging outputs of the second pixels.

12. A non-transitory storage medium, storing computer instructions that, when executed by a processing device, cause the processing device to:
    illuminate, during a first illumination phase, using a laser illumination system, a first cluster of one or more first pixels of a pixel array of a depth map sensor, while not illuminating a second cluster, different from the first cluster, of one or more second pixels of the pixel array of the depth map sensor; and
    detect, during the first illumination phase, using the second cluster, a level of illumination of the second cluster.

13. The non-transitory storage medium of claim 12, wherein the computer instructions, when executed by the processing device, cause the processing device to compare the detected level of illumination of the second cluster, during the first illumination phase, with a first threshold value to verify safety of the laser illumination system.

14. The non-transitory storage medium of claim 13, wherein the computer instructions, when executed by the processing device, cause the processing device to detect, during the first illumination phase, using the first cluster, a level of illumination of the first cluster, the first threshold value being a variable threshold having a level generated based on the detected level of illumination of the first cluster.

15. The non-transitory storage medium of claim 12, wherein the computer instructions, when executed by the processing device, cause the processing device to:
    illuminate, during a second illumination phase, using the laser illumination system, the second cluster, while not illuminating the first cluster; and
    detect, during the second illumination phase, using the first cluster, a level of illumination of the first cluster.

16. The non-transitory storage medium of claim 15, wherein the computer instructions, when executed by the processing device, cause the processing device to compare the detected level of illumination of the first cluster, during the second illumination phase, with a second threshold value to verify safety of the laser illumination system.

17. A device comprising:
    a laser illumination system;
    a first cluster of one or more first pixels of a pixel array of a depth map sensor,
    a second cluster, different from the first cluster, of one or more second pixels of the pixel array of the depth map sensor; and
    a control circuit configured to:
        illuminate, during a first illumination phase, using the laser illumination system, the first cluster while not illuminating the second cluster; and
        detect, during the first illumination phase, using the second cluster, a level of illumination of the second cluster.

18. The device of claim 17, wherein the laser illumination system comprises a least one vertical-cavity surface-emitting laser.

19. The device of claim 17, wherein each pixel comprises at least one single-photon avalanche diode.

20. The device of claim 17, wherein the control circuit is configured to compare the detected level of illumination of the second cluster, during the first illumination phase, with a first threshold value to verify safety of the laser illumination system.

21. The device of claim 20, wherein the control circuit is configured to detect, during the first illumination phase, using the first cluster, a level of illumination of the first cluster, the first threshold value being a variable threshold having a level generated based on the detected level of illumination of the first cluster.

22. The device of claim 17, wherein the control circuit is configured to:
    illuminate, during a second illumination phase, using the laser illumination system, the second cluster, while not illuminating the first cluster; and detect, during the second illumination phase, using the first cluster, a level of illumination of the first cluster.

23. The device of claim 22, wherein the control circuit is configured to compare the detected level of illumination of the first cluster, during the second illumination phase, with a second threshold value to verify safety of the laser illumination system.

* * * * *